Jan. 9, 1940.   M. E. WESTBROOKE   2,186,597
PROTECTIVE DEVICE
Original Filed Aug. 16, 1933   2 Sheets-Sheet 1

Inventor
Milo E. Westbrooke
by Parker & Carter
Attorneys.

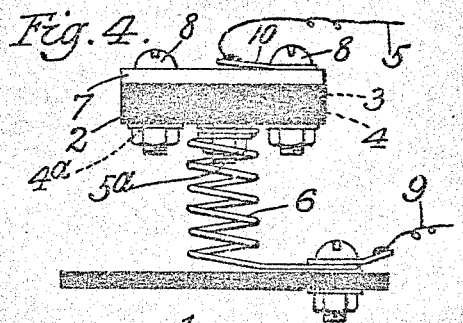
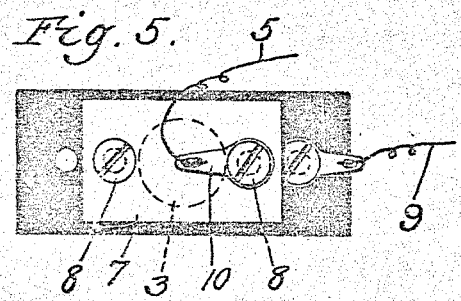
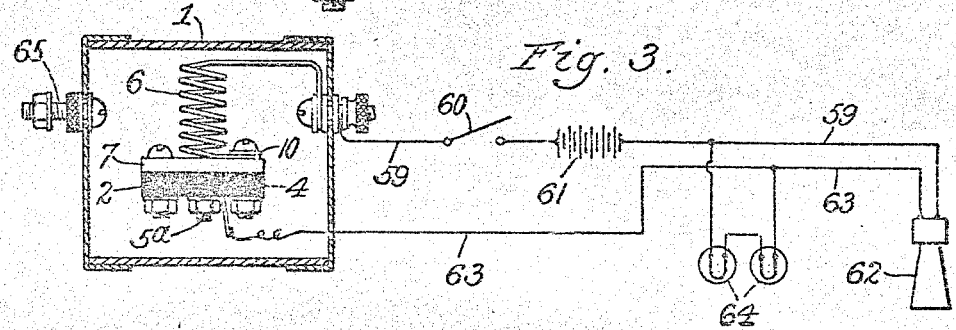

Patented Jan. 9, 1940

2,186,597

UNITED STATES PATENT OFFICE 2,186,597

PROTECTIVE DEVICE

Milo E. Westbrooke, Chicago, Ill., assignor to Donald M. Carter, Chicago, Ill.

Application August 16, 1933, Serial No. 685,263
Renewed June 7, 1939

5 Claims. (Cl. 200—52)

This invention relates to protective devices and has for its object to provide a protective device particularly adapted for automobiles. The invention has as a further object to provide a protective device which gives a warning when the automobile or other property is tampered with. The invention has other objects which are more particularly pointed out in the accompanying description.

In the drawings I have illustrated my device as applied to an automobile, but it is of course evident that it may be applied to other devices to be protected. Referring now to the drawings, Fig. 1 is a view showing an automobile with a protective device installed thereon;

Fig. 3 is a view of the horn alarm alone;

Fig. 4 is a side view of one form of automatic circuit breaker and maker;

Fig. 5 is a plan view of the device shown in Fig. 4;

Like numerals refer to like parts throughout the several figures.

Automobiles as at present built are mounted on springs and any attempt to tamper with such automobiles moves or rocks them. If, for example, someone should attempt to remove something attached to the automobile or to open the door or jack it up or take hold of it, the body of the automobile will move or rock, due to its method of suspension. When the device is applied to an automobile I prefer to arrange it so that any movement of the automobile will set the device in operation to sound the horn. I also prefer to arrange the device so that when it is in operative condition, if anyone touches the automobile or attempts to jump upon the rear bumper or takes hold of the handle of the door, such party will receive a shock. It has become quite the practice of holdup men to jump upon the running board of a car when it stops at a stop signal and rob the occupants of the car, and perhaps take the car itself. I prefer to arrange my device so that if anyone jumps upon the running board of the car he will get such a shock as to cause him to take no further action, but hastily leave the automobile and permit the occupants to drive on.

Figure 1:
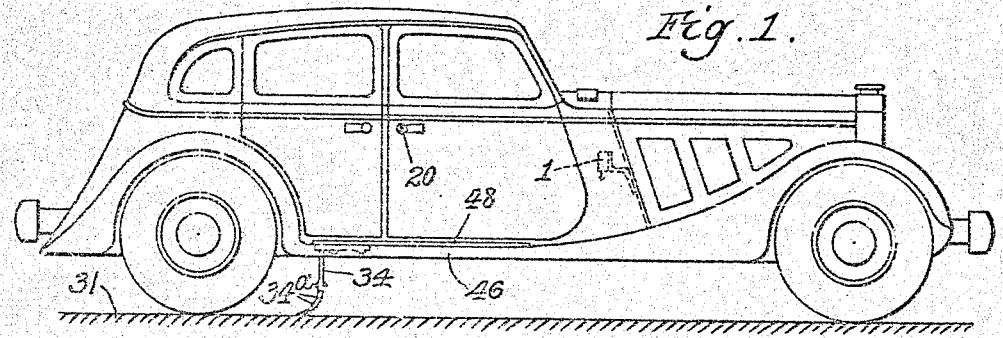
Figure 2:
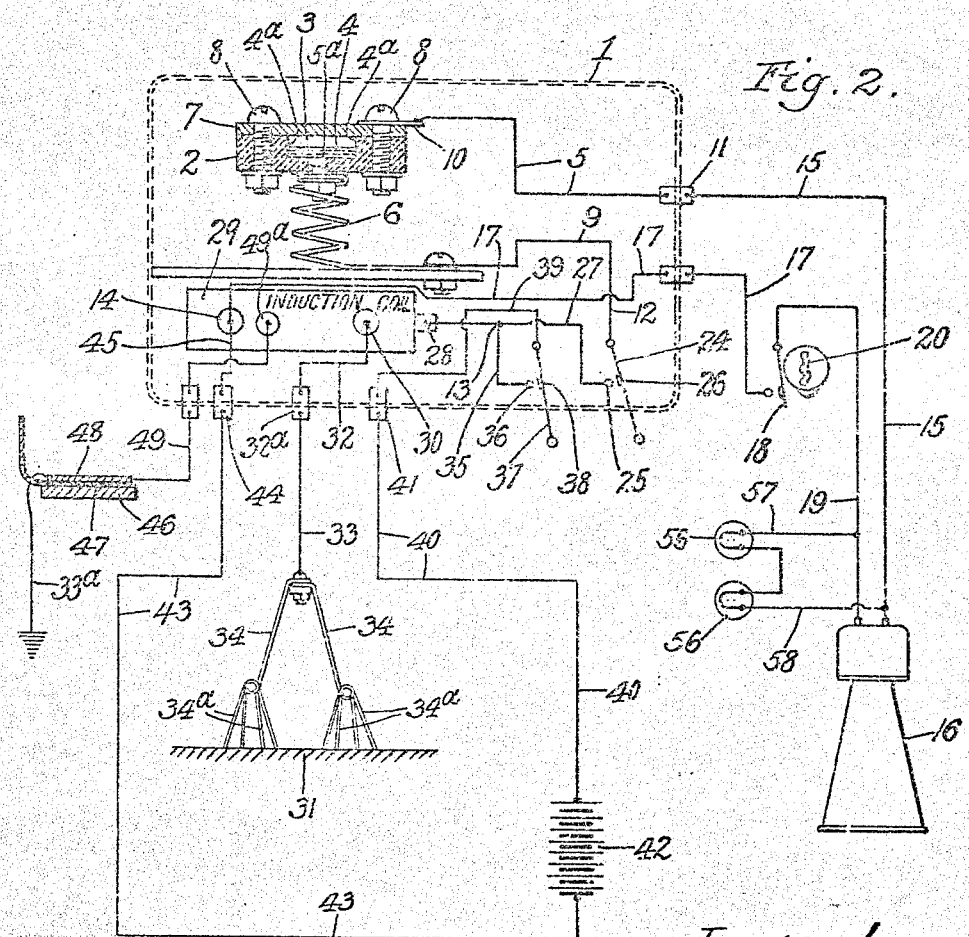
Fig. 2 is a diagrammatic view of the electric circuits and parts employed in one form of the device.

The apparatus can be compressed into a small size and can be easily and conveniently located in the automobile at any desired point. I have shown one form of construction where the apparatus is contained in a box or receptacle 1, illustrated in Fig. 3, which may be made of an exceedingly small size, the largest dimension being not over four to six inches. For the purpose of sounding the horn when the car is touched I provide an automatic circuit making and breaking device, one form of which is shown in Figures 4 and 5. An automatic switch or circuit making and breaking device is provided in circuit which is reliable and preferably of a nature that the user cannot tamper with it. I prefer to have a device for this purpose wherein mercury is used to make and break the circuit. Such a device is illustrated in Figs. 2, 4 and 5, wherein there is provided a member 2 of insulating material, provided with a receiving space 3 containing mercury 4. This receiving space may be of any suitable size and shape. I prefer, however, to have it with straight sides 4a. This receiving space is partially filled with mercury. A contact 5a is engaged by the mercury 4 and projects through the member 2, the mercury at all times being in electrical connection with this contact. This contact is connected in circuit by the conductor 8, preferably through the agency of a spring 6 which acts as an elastic suspending device for the switch.

A second member 7 of iron or other suitable conducting material is attached to the member 2 by the fastening devices 8. This member 7 is connected in circuit by the wire 5 which may be attached to it in any desired manner, as by being attached to the contact 10 pressed under the head of one of the fastening devices 8. It will be seen, therefore, that the switch or circuit making and breaking device has contacts which, when the device is stationary, are out of electrical contact. It will further be seen that this switch is elastically suspended so that when on the automobile, and the automobile is moved or rocked by any party taking hold of it or tampering with it, the mercury will be moved to make contact between the contacts 5a and the member 7 and contact 10 so that a circuit will be completed through the switch and the wires 5 and 9. The mercury will be moved back and forth by the movement of the automobile and this circuit will therefore be made and broken at intervals. It will further be seen that in the particular construction shown the spring 6 is used as a part of the circuit, but the circuit may be directly connected with the contact 5a if desired. This spring is made of the desired size and strength and number of coils to meet the conditions of its use.

The conductor 5 is connected with a contact 11 associated with the receptacle 1, see Fig. 2. The conductor 9 is connected with the conductor 12, which leads to the battery through switches 24 and 37 and conductors 27, 39 and conductor 40. The conductor 5, through the agency of the contact 11, is connected to the conductor 15 which leads to the horn 16. The conductor 19 leads from the horn to switch 18 which connects with conductor 17, which leads to the battery through contact 14 and conductor 43 so that when the switch 18 is closed and the car moved, the circuit will be alternately made and broken through the horn and cause it to sound.

The switch 18 may be of any desired form, such as a hand switch, but I prefer to have it a switch operated by a key from the outside of the car so that when the key is placed in the key hole 20 and turned the circuit will be completed. Such a key must have an insulated handle so that the owner of the car will not get a shock.

The conductor 12 is connected with a switch 24 located inside the car, which has a contact 25 and a movable contact 26 which may be moved to complete or open the circuit. The contact 25 is connected by a conductor 27 with one terminal 28 of the induction coil 29 and connects the battery with the primary coil of the induction coil, the current from the battery dividing at 13, part going to the induction coil and part going through the switches 37 and 25 to the circuit breaker. The terminal 30 of said induction coil is connected to the earth or pavement 31 by the conductors 32 and 33 of the high tension line, which conductors are connected to the contact 32a on the receptacle 1. The conductor 33 is arranged so as to drag on the ground as the car is moved so that contact with earth or pavement will be maintained at all times. Any suitable device for dragging on the ground may be used. In order to insure the certainty of the device and prevent it from being tampered with, I prefer to provide a construction consisting of a stiff wire 34, either bent into a loop or made into two members, and attached to the bottom of the car. There is attached to the ends of the wire 34 a series of smaller wires 34a, which smaller wires are preferably made of very stiff material but may still be bent slightly so as to insure at all times a proper contact with the ground 31. The parts are arranged so that a person standing on the ground and touching the car will complete the high tension circuit and thereby receive an electric shock.

The conductor 27 is also connected by a conductor 35 with the contact 36 of the switch 37 on the inside of the car. This switch has the movable contact 38 which may be moved to make or break the circuit. This movable contact is connected to one terminal of the battery by conductors 39 and 40, connected with the contact 41 on the receptacle 1, the conductor 40 being connected to the battery 42. The other terminal of the battery is connected by a conductor 43 with the contact 44 on the receptacle 1, and this contact is connected by a conductor 45 with the coil of the induction coil. A high tension connection is also made to one or both running boards of the car. This may be made in various ways and for purposes of illustration I have shown one method of doing this. In this construction the running board 46 is provided on its top with an insulating piece 47, and upon this is a metal piece 48 which is covered with a water shedding material so that water will not reach the material and which is of such size and such position that it will be engaged by the foot of anyone stepping on the running board. This metal piece is connected by a conductor 49 with the high tension circuit, say the other end of the secondary coil of the induction coil at 49a, and as herein shown the body of the car is connected with the ground by conductor 33a.

In Fig. 3 I have shown a simple construction for use with the horn and lights alone; in this construction the circuit breaker is placed in a receptacle 1, a conductor 59 leads from the contact 10 through the spring 6 through a switch 60 to the source of electric supply 61 and thence to horn 62, a conductor 63 leads from the horn to the other contact 5a.

The head lights 64 are also connected in this circuit when the automobile body is rocked. With the switch 60 closed the horn will be sounded and the lights will blink. The receptacle 1 may be attached to the automobile in any convenient place by fastening device 65. Switch 60 is preferably mounted on the receptacle 1.

The use and operation of my invention are as follows:

When the driver leaves the car, for example, he closes switches 24 and 36, and if he gets out of the car he closes with his key the switch 18. If anyone attempts to tamper with the car the car will be rocked or vibrated and the automatic circuit making and breaking device will be set into operation to make and break the circuit through the horn and the horn will be sounded. This will give the alarm and frighten the intruders away. When the circuit is connected with the lights, the lights will also be lighted and extinguished, that is blinked.

Before the driver gets in the car he opens the switch 18 and this disconnects the horn from the alarm circuit.

It will therefore be seen that I have here a simple and effective device which can be easily and quickly added to any automobile and which effectively acts to prevent tampering with the automobile or the removal of accessories therefrom. When a car is supplied with my protective device several cars not having a protective device may be protected by having some metal part on the cars in contact with each other and with the car having the protective device thereon. This is particularly true in connection with the sounding of the horn and the blinking of the lights.

I claim:

1. A protecting device comprising an automatic switch comprising two vertically spaced contacts, mercury intermediate said contacts, a movable support for said vertically spaced contacts and mercury, a separate movable part, an elastic connection between said separate movable part and said support, said support being responsive to the combined action of inertia and said elastic connections to move said support up and down and sidewise to move said mercury to bring it into contact with both of said contacts when said separate movable part is moved, whereby the circuit is closed by vertical as well as horizontal vibrations.

2. A protecting device comprising an automatic switch comprising two vertically spaced contacts, mercury intermediate said contacts, a movable support for said vertically spaced contacts and mercury, a substantially vertically extending spring connected with said support, said support being responsive to the combined action of inertia and said spring to move up and down and sidewise to move said mercury to bring it into contact with both of said contacts when the spring and the support are vibrated, whereby the circuit is closed by vertical as well as horizontal vibrations.

3. A protective device comprising a switch with vertically spaced contacts, mercury normally engaging one of said contacts, a support which flexes up and down as well as sidewise, whereby the circuit is closed by vertical as well as horizontal vibrations.

4. In a theft-prevention alarm device for inclusion in the electrical circuit of a vehicle horn, a circuit-closing cell containing relatively movable contact elements positioned in the circuit for closing the same to operate the horn upon any engagement of the contact elements brought about by any movement of the cell, and a vertically disposed helical spring on the upper end of which the cell is mounted for either up-and-down or tilting movement in any direction.

5. In a theft-prevention alarm device for inclusion in the electrical circuit of a vehicle horn, a circuit-closing cell containing relatively movable contact elements positioned in the circuit for closing the same to operate the horn upon any movement of the contact elements brought about by any movement of the cell, and a vertically disposed helical spring upon the upper end of which the cell is mounted for either up-and-down or tilting movement in any direction, said spring also forming a part of the circuit and being provided at its lower end with a horizontal extending section which terminates in an attaching portion.

MILO E. WESTBROOKE.